(12) United States Patent
Holman

(10) Patent No.: US 11,150,324 B2
(45) Date of Patent: Oct. 19, 2021

(54) DISPLACEMENT SENSING TO LOCALIZE MOVEMENT

(71) Applicant: Facebook Technologies, LLC, Menlo Park, CA (US)

(72) Inventor: David Holman, Toronto (CA)

(73) Assignee: Facebook Technologies, LLC, Menlo Park, CA (US)

( * ) Notice: Subject to any disclaimer, the term of this patent is extended or adjusted under 35 U.S.C. 154(b) by 180 days.

(21) Appl. No.: 16/383,996

(22) Filed: Apr. 15, 2019

(65) Prior Publication Data

US 2019/0317180 A1    Oct. 17, 2019

Related U.S. Application Data

(60) Provisional application No. 62/657,270, filed on Apr. 13, 2018.

(51) Int. Cl.

| | |
|---|---|
| *G01S 5/02* | (2010.01) |
| *H04B 1/3827* | (2015.01) |
| *H01Q 1/27* | (2006.01) |
| *H01Q 21/06* | (2006.01) |
| *G06F 3/01* | (2006.01) |

(52) U.S. Cl.
CPC .......... *G01S 5/0284* (2013.01); *G01S 5/0221* (2013.01); *G01S 5/0226* (2013.01); *G06F 3/011* (2013.01); *H01Q 1/273* (2013.01); *H01Q 21/061* (2013.01); *H04B 1/385* (2013.01); *H04B 2001/3861* (2013.01)

(58) Field of Classification Search
CPC ........ G01S 5/02; G01S 5/0221; G01S 5/0284; G01S 5/14; G01S 5/06; G01S 13/878; G06F 3/011; H01Q 1/273; H01Q 21/061; H04B 1/385; H04W 64/00
USPC .......................................................... 342/463
See application file for complete search history.

(56) References Cited

U.S. PATENT DOCUMENTS

2002/0145563 A1* 10/2002 Kane ......................... G01S 5/04
  342/442
2019/0044549 A1*  2/2019 Pillai ........................ H04W 4/70

FOREIGN PATENT DOCUMENTS

CN           206270483      *  6/2017  ............... G01S 5/16

* cited by examiner

*Primary Examiner* — Harry K Liu
(74) *Attorney, Agent, or Firm* — FisherBroyles, LLP

(57) ABSTRACT

A controller is formed as an array of transmitting antennas and receiving antennas that are placed on the skin of a user so that the underlying movement of the user's skin can be measured by the interaction of the transmitting antennas and the receiving antennas. In an embodiment, the transmitting antennas and receiving antennas are located in an area proximate to the wrist. The movement of the transmitting antennas and subsequent measurement of signals received by receiving antennas are used in order to determine position and pose of the hand and its digits.

20 Claims, 4 Drawing Sheets

DISPLACEMENT SENSING TO LOCALIZE MOVEMENT

This Application claims the benefit of U.S. Provisional Application Ser. No. 62/657,270, filed Apr. 13, 2018, the contents of which are hereby incorporated by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed apparatus and methods relate in general to the field of human-machine interface controllers, and in particular to a human-machine interface controller that is sensitive to deformation.

BACKGROUND

In recent years virtual reality (VR) and augmented reality (AR) have become increasingly popular as computational power and immersive possibilities become more common. Generally, while systems and methods offer ways to interact with VR and AR environments, frequently the mechanism for interacting with these types of environments detracts from the immersive nature.

What is needed are controllers that provide detailed information relative to a user's gestures and other interactions without detracting from the immersiveness of the overall system.

BRIEF DESCRIPTION OF THE DRAWINGS

The foregoing and other objects, features, and advantages of the disclosure will be apparent from the following more particular description of embodiments as illustrated in the accompanying drawings in which reference characters refer to the same parts throughout the various views. The drawings are not necessarily to scale, emphasis instead being placed upon illustrating principles of the disclosed embodiments.

DETAILED DESCRIPTION

Figure 1:
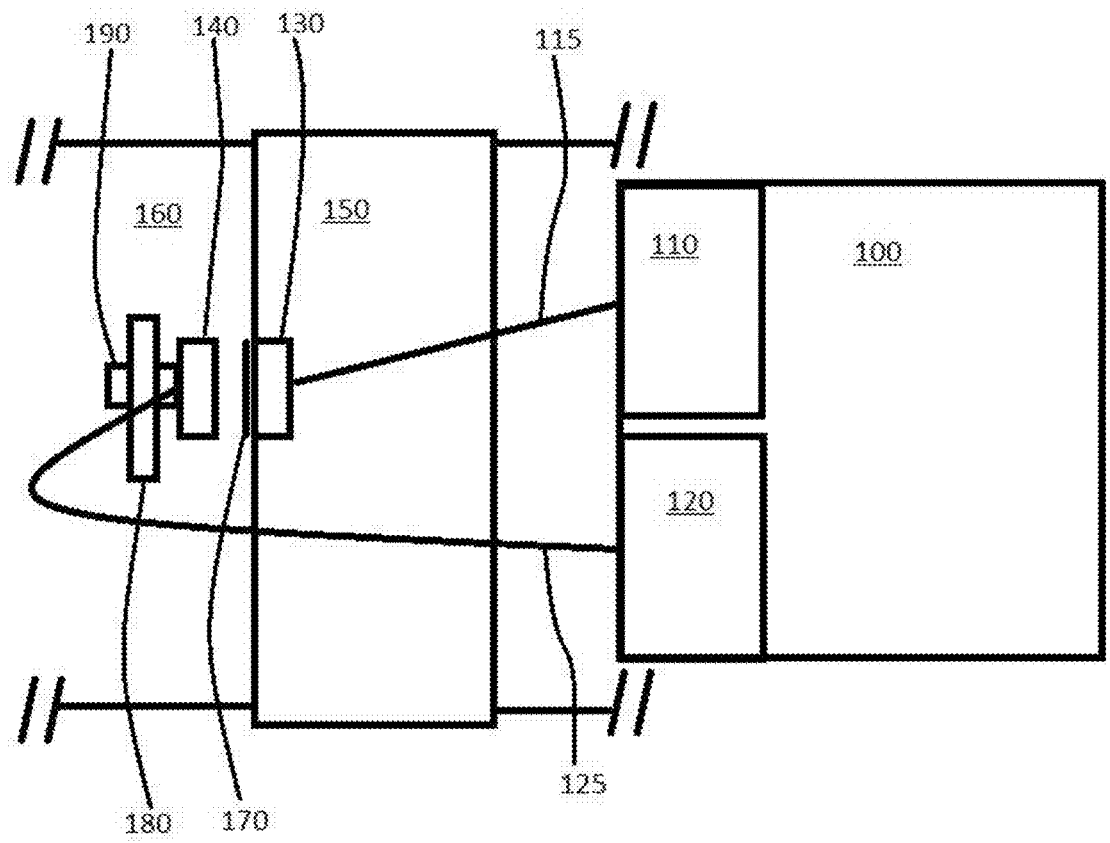
FIG. 1 shows a diagram illustrating the interaction of components of an embodiment of a controller.

This application relates to user interfaces such as found in U.S. Provisional Patent Application No. 62/621,117; U.S. patent application Ser. No. 16/049,159; U.S. patent application Ser. No. 16/055,785; U.S. patent application Ser. No. 16/251,955; The entire disclosure of those applications, and the applications incorporated therein by reference, are incorporated herein by reference.

In various embodiments, the present disclosure is directed to motion sensing controllers, and methods for designing, manufacturing and operating motion controllers (e.g., hand movement controllers), and in particular controllers using signals to determine an amount of deformation of a surface in order to model motion of a body part. Throughout this disclosure, various controller shapes and sensor patterns are used for illustrative purposes. Although example compositions and/or geometries are disclosed for the purpose of illustrating the invention, other compositions and geometries will be apparent to a person of skill in the art, in view of this disclosure, without departing from the scope and spirit of the disclosure herein.

Throughout this disclosure, the terms "deformation," or other descriptors may be used to describe events or periods of time in which a human-machine interaction is taking place, e.g., a user's deformation of skin surface in the wrist area. Detections of deformation may be processed and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being orthogonal to each other in frequency, in which case, they could not be the same frequency.

The term "controller" as used herein is intended to refer to a physical object that provides the function of human-machine interface. In an embodiment, the controller is a wristband. In an embodiment, the controller is able to detect the movements of a hand through detection of the deformation of surface areas of the wrist area. In an embodiment, the controller is able to detect the movements of a hand through detection of the movement of the wrist area. In an embodiment, the controller is able to detect the movements of a hand by sensing such movements directly. In an embodiment, the controller may provide the position of a hand through the determination of deformation of surface areas in the wrist area. In an embodiment, the controller may provide position and/or movement of other body parts through the determination of deformation of surface areas proximate to and/or associated with the body part and/or function, e.g., the articulation of the bones, joints and muscles of the wrist area and how it translates into the position and/or movement of the hand; the articulation of the bones, joints and muscles of the ankle area and how it translates into position and/or movement of the foot; the vibration and movement of the vocal cords and how it translates into speech.

The controllers discussed herein use antennas that function as transmitting antennas and receiving antennas. However, it should be understood that whether the antennas are transmitting, receiving, or both depends on context and the embodiment. When used for transmitting, the conductor is operatively connected to a signal generator. When used for receiving, the conductor is operatively connected to a signal receiver. In an embodiment, the transmitting antennas and receiving antennas for all or any combination of the patterns are operatively connected to a single integrated circuit capable of transmitting and receiving the required signals. In an embodiment, the transmitting antennas and receiving antennas are each operatively connected to a different integrated circuit capable of transmitting and receiving the required signals, respectively. In an embodiment, the transmitting antennas and receiving antennas for all or any combination of the patterns may be operatively connected to a group of integrated circuits, each capable of transmitting and receiving the required signals, and together sharing information necessary to such multiple IC configuration. In an embodiment, where the capacity of the integrated circuit (i.e., the number of transmit and receive channels) and the requirements of the patterns (i.e., the number of transmit and receive channels) permit, all of the transmitting antennas and receiving antennas for all of the multiple patterns used by a controller are operated by a common integrated circuit, or by a group of integrated circuits that have communications therebetween. In an embodiment, where the number of transmit or receive channels requires the use of multiple integrated circuits, the information from each circuit is combined in a separate system. In an embodiment, the separate system comprises a GPU and software for signal processing.

The term antenna is often used interchangeably with the term conductor (or electrode) when referring to the interacting pairs. Specifically, where a signal is transmitted on one conductor/antenna, a field is created between that conductor/antenna and one or more other conductors/antennas (e.g., at least one receiver conductor—but there can be many). The field created can be disturbed by certain kinds of interactions, e.g., the presence of human body parts or other objects. Sensing is accomplished by measuring small changes in the field. In an embodiment, changes in the magnitude of a signal received at the receiver are measured and used to derive sensing information. In an embodiment, changes in the phase of a signal received at the receiver are measured and used to derive sensing information. In an embodiment, sensing relies on fusion of multiple measurements (e.g., magnitude and phase), including measurements made by other sensors. It will be apparent to a person of skill in the art in view of this disclosure that although the elements that operatively join conductors/antennas described herein with the driving or receiving circuitry (e.g., signal generators or signal receivers) may be conductive, may be flexible, and may even be referred to as a conductor, it does not refer to the conductor/antenna for sensing interactions.

Turning to FIG. 1, a diagram of an embodiment is shown that sets forth an example of a controller. In an embodiment, a mixed signal integrated circuit 100 with signal processing capabilities comprises a transmitter 110, and a receiver 120. (In an embodiment, an analog front end comprising a transmitter (or multiple transmitters) and a receiver (or multiple receivers) is used to send and receive signals instead of the mixed signal integrated circuit 100. In such an embodiment, the analog front end provides a digital interface to signal generating and signal processing circuits and/or software.)

The transmitter 110 is conductively coupled to a transmitting antenna 130 via transmit lead 115, and the receiver 120 is conductively coupled to a receiving antenna 140 via receive lead 125. The transmitting antenna 130 is supported on a first structure 150 that is worn on body part 160. The first structure 150 is worn on or about the body part 160 such that it will move, generally, with the body part 160. In an embodiment, the receiving antenna 140 comprises a support 190, that may be separately affixed to the skin of the body part 160, for example, by using tape 180. Alternatively, receiving antenna 140 is affixed to a second structure (not shown) that is adapted to move with the movement of the skin of the body part 160, rather than the more gross movements of the body part 160. In an embodiment, the second structure comprises a more flexible material than the first structure. In an embodiment, a layer of material 170 separates the transmitting antenna 130 and the receiving antenna 140.

It will be apparent to a person of skill in the art in view of this disclosure that the transmitter and receivers are arbitrarily assigned, and the transmitter 110, transmit lead 115 and transmitting antenna 130 can be used on the receive side, while the receiver 120, receive lead 125 and the receiving antenna 140 can be used as the transmit side. It will also be apparent to a person of skill in the art in view of this disclosure that the signal processor, transmitter and receiver may be implemented on separate circuits. It will be apparent to a person of skill in the art in view of this disclosure that the transmitter and receivers may support more than one antenna. In an embodiment, a plurality of transmitting antennas 130 and/or a plurality of receiving antennas 140 are employed. In an embodiment, multiple transmitting antennas are supported on the first structure. In an embodiment, multiple receiving antenna are supported on a second structure. In an embodiment, both transmitting and receiving antennas are supported on the first structure. In an embodiment, both transmit and receiving antennas are supported on a second structure.

In an embodiment, the mixed signal integrated circuit 100 is adapted to generate one or more signals and send the signals to the transmitting antenna 130 via the transmitter 110. In an embodiment, the mixed signal integrated circuit 100 is adapted to generate a plurality of frequency-orthogonal signals and send the plurality of frequency-orthogonal signals to the transmitting antennas 130. In an embodiment, the mixed signal integrated circuit 100 is adapted to generate a plurality of frequency-orthogonal signals and one or more of the plurality of frequency-orthogonal signals to each of a plurality of transmitting antennas. In an embodiment, the frequency-orthogonal signals are in the range from DC up to about 2.5 GHz. In an embodiment, the frequency-orthogonal signals are in the range from DC up to about 1.6 MHz. In an embodiment, the frequency-orthogonal signals are in the range from 50 KHz to 200 KHz. The frequency spacing between the frequency-orthogonal signals should be greater than or equal to the reciprocal of the integration period (i.e., the sampling period).

In an embodiment, the mixed signal integrated circuit 100 (or a downstream component or software) is adapted to determine at least one value representing each frequency orthogonal signal transmitted by a transmitting antenna 130. In an embodiment, the mixed signal integrated circuit 100 (or a downstream component or software) performs a Fourier transform to received signals. In an embodiment, the mixed signal integrated circuit 100 is adapted to digitize received signals. In an embodiment, the mixed signal integrated circuit 100 (or a downstream component or software) is adapted to digitize received signals and perform a discrete Fourier transform (DFT) on the digitized information. In an embodiment, the mixed signal integrated circuit 100 (or a downstream component or software) is adapted to digitize received signals and perform a Fast Fourier transform (FFT) on the digitized information.

In an embodiment, received signals are sampled at at least 1 MHz. In an embodiment, received signals are sampled at at least 2 MHz. In an embodiment, received signals are sampled at 4 Mhz. In an embodiment, received signals are sampled at more than 4 MHz.

To achieve KHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. In an embodiment, the frequency spacing is equal to the reciprocal of the integration period. (It will be apparent to one of skill in the art in view of this disclosure that taking 4096 samples at, e.g., 4 MHz would yield an integration period slightly longer than a millisecond, and not achieving kHz sampling, and a minimum frequency spacing of 976.5625 Hz.) In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, an FFT is used to transform the digitized received signals into bins of information, each reflecting the frequency of a frequency-orthogonal signal transmitted which may have been transmitted by the transmit antenna 130. In an embodiment 4096 bins correspond to frequencies from 1 KHz to about 4 MHz. It will be apparent to a person of skill in the art in view of this disclosure that these examples are simply that, exemplary. Depending on the needs of a system, and subject to the constraints described above, the sample rate may be increased or decrease, the integration period may be adjusted, the frequency range may be adjusted, etc.

In an embodiment, quantified changes measured from the signals received by the receiving antennas can be used to determine a position or motion of a body part such as wrist body part. In an embodiment, quantified changes can be used to determine a position or motion of a body part such as the articulation of the bones, joints, tendons and muscles. In an embodiment, quantified changes can be used to determine a position or motion of a body part such as the articulation of the bones, joints and muscles of the wrist area. In an embodiment, quantified changes can be used to determine the position and/or movement of a hand, wrist, foot, ankle, head, neck, torso, arm, shoulder, or any other body part, or a portion of a body part. In an embodiment, quantified changes can be used to determine elastic movement of skin in relation to a body or body part. In an embodiment, quantified changes can be used to determine the vibration and movement of vocal cords. In an embodiment, quantified changes can be used to deduce sounds or speech from the vibration and movement of vocal cords. In an embodiment, quantified changes can be used to determine respiration, heart activity, pulse or other biomechanical changes.

In an embodiment, multiple receiving antennas and multiple transmitting antennas are interspersed. In an embodiment, antennas are formed as three-dimensional objects (or the faces of such three-dimensional objects), examples of which include: cubes, rectangular prisms, triangular prisms, octagonal prisms, tetrahedrons, square pyramids, cylinders and cones. In such an embodiment, interleaving in two or more dimensions is possible. For example, 2 mm cubes could be placed e.g., 2 mms apart in a two dimensional grid on a skin-tracking second structure that is, e.g. 1" wide and worn on the wrist, while another layer of similar cubes could be deployed in a less flexible second structure that is ½" wide, and which circumscribes first, but is affixed so that it generally covers only the center ½" of the second structure. In an embodiment, a large dense array of e.g., alternating transmitters and receivers can interact. Using the mixed signal integrated circuit 100 described above, or another system that can transmit and receive frequency-orthogonal signals, and detect changes in signal interaction, a great deal about hand and wrist motion can be gleaned. In an embodiment, each transmitting antenna can be used to transmit a plurality of frequency-orthogonal signals. In an embodiment, the location of transmitting antenna and receiving antenna can be dynamically re-configured, allowing each antenna to operate as either a transmitter or a receiver during any integration period. In an embodiment, an antenna can be used as both a transmitter and a receiver (albeit of different frequency-orthogonal signals) during a single integration period. In an embodiment, two groups of antenna are used as both transmitters and receivers during the same integration period; the first group of antenna has its received signals passed through a high pass filter and are used to transmit only low frequencies, while the second group of antenna has its received signals passed through a low pass filter and transmit only high frequencies.

Figure 2:
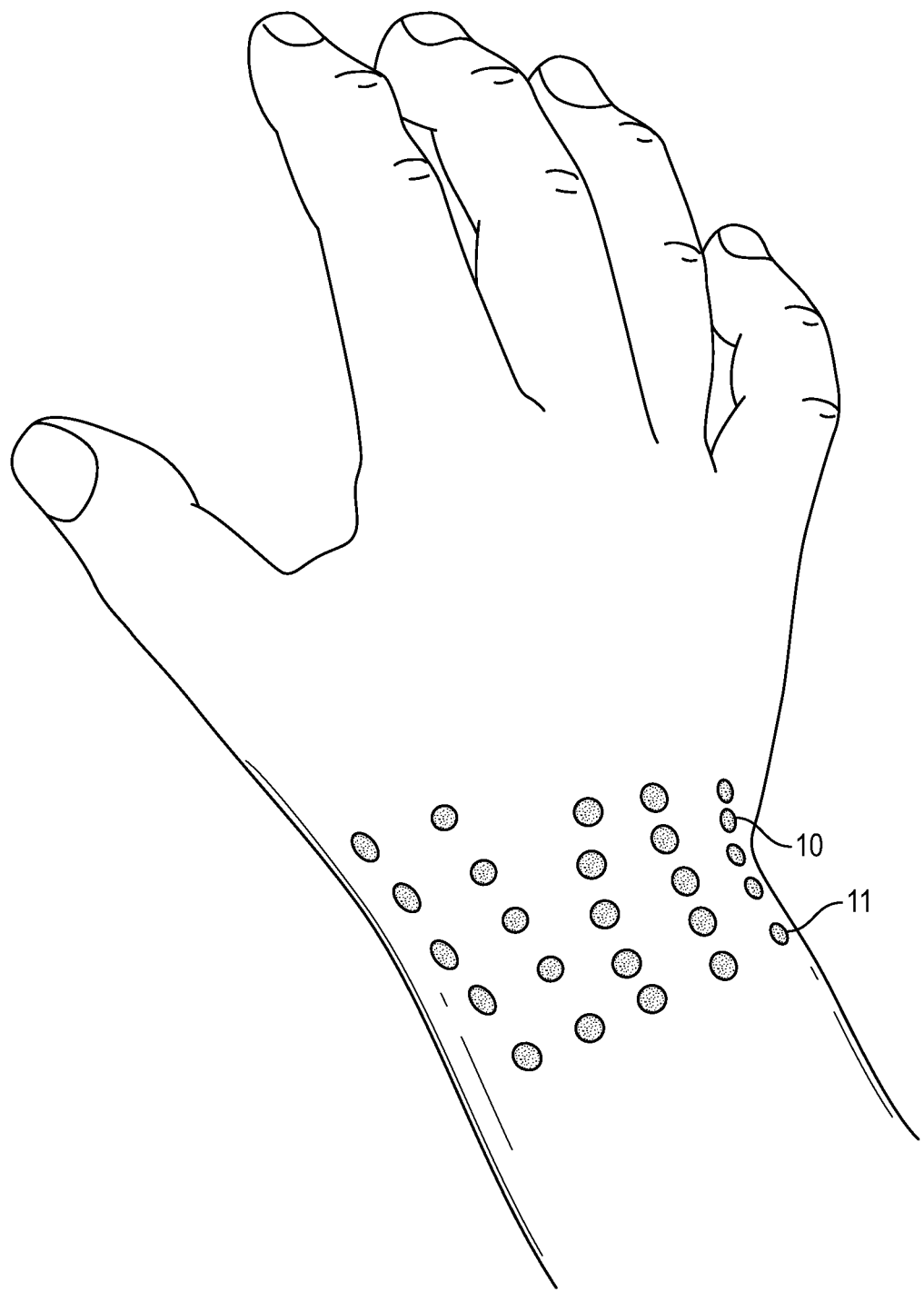
FIG. 2 shows an embodiment of a controller located on a wrist of a user.
Figure 3:
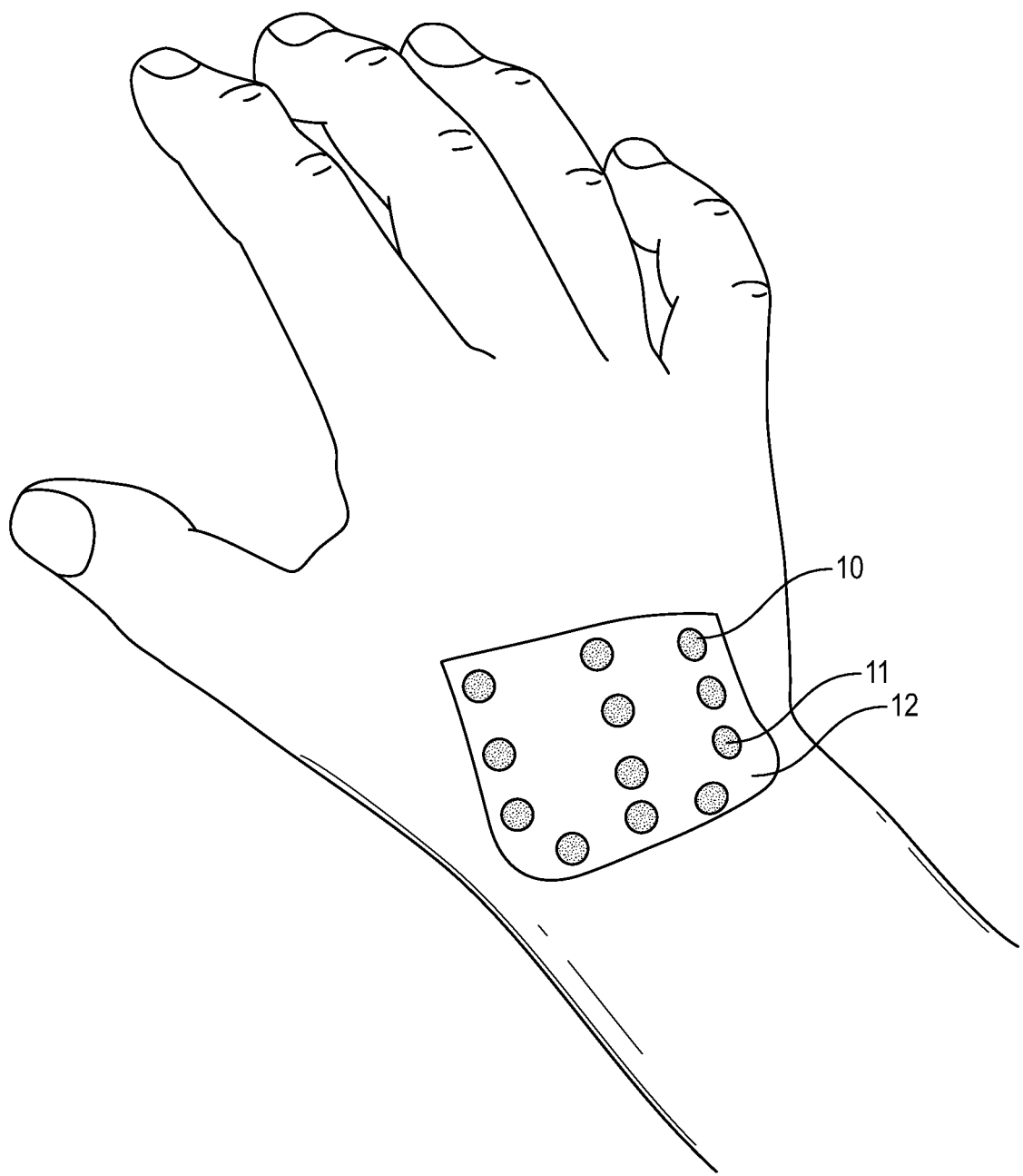
FIG. 3 shows an embodiment of a controller located on a wrist of a user.
Figure 4:
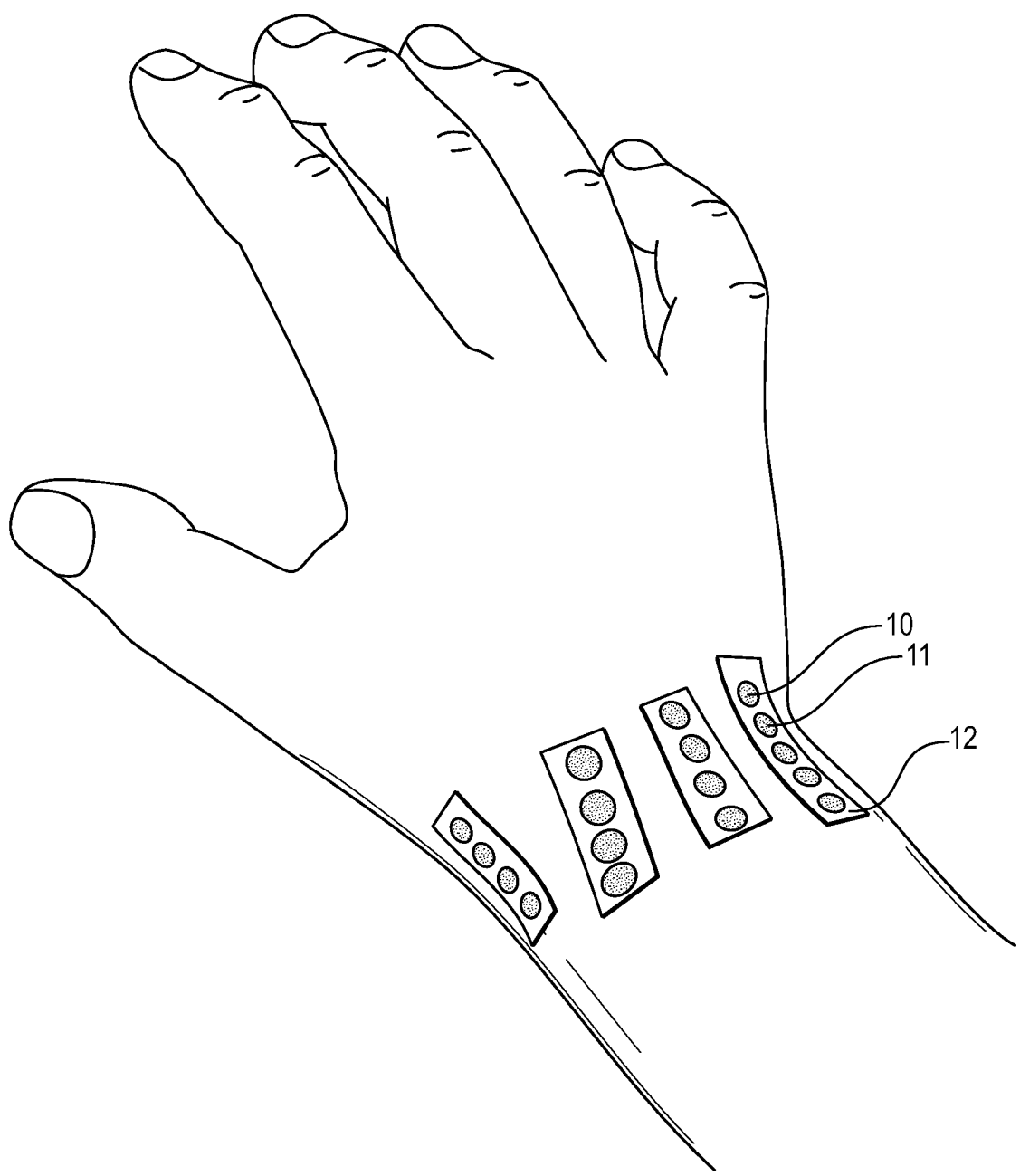
FIG. 4 shows an embodiment of a controller located on a wrist of a user.

Turning now to FIGS. 2-4, shown are combinations of transmitting antennas 10 and receiving antennas 11 that are located in the wrist area. The placement of transmitting antennas 10 and receiving antennas 11 are such that they are also located above and below the wrist. In an embodiment the transmitting antennas 10 and the receiving antennas 11 are located within 5 centimeters of the wrist, either above or below. In an embodiment the transmitting antennas 10 and the receiving antennas 11 are located within 3 centimeters of the wrist, either above or below. In an embodiment, the transmitting antennas 10 and the receiving antennas 11 are located within 1 cm of the wrist, either above or below.

FIG. 2 shows a matrix view of the position of transmitting antennas 10 and receiving antennas 11 positioned on skin of a user. The transmitting antennas 10 and the receiving antennas 11 may be arranged in a variety of patterns. In an embodiment, the transmitting antennas 10 and receiving antennas 11 are arranged in an alternating pattern. In an embodiment, the transmitting antennas 10 and receiving antennas 11 are arranged so that one row is transmitting antennas 10 and one row is receiving antennas 11. In an embodiment, the transmitting antennas 10 and receiving antennas 11 may be arranged in a random distribution. In an embodiment, the transmitting antennas 10 and receiving antennas 11 are arranged so that there are more transmitting antennas 10 than there are receiving antennas 11. In an embodiment, the transmitting antennas 10 and receiving antennas 11 are arranged so that there are more receiving antennas 11 than there are transmitting antennas 10. In an embodiment, the transmitting antennas 10 and receiving antennas 11 alternate their respective roles so that during one frame all the transmitting antennas 10 transmit signals while the receiving antennas 11 adapted to receive signals and in the next frame that receiving antennas 11 transmit signals and vice versa.

Measurements determined by the interaction of the transmitting antennas 10 and receiving antennas 11 are processed in order to determine movement, position and poses of the hand. Very slight movements by the digits of the hand can be detected by the movement and elasticity of the skin and the movement of the antennas attached thereto. The expansion, contraction and shifting of skin in the wrist area may be caused by, e.g., muscle, ligament or bone movement in the wrist area, articulation of joints in the hand, wrist or arm and blood flow in the wrist area. The very slight movement of one transmitting antenna 10 with respect to a receiving antenna 11 can be measured. The measurements (e.g., magnitude and/or phase) can be processed and used to form a model of the hand. Each of the transmitting antennas 10 may transmit a unique frequency orthogonal signal. Each of the receiving antennas 11 receiving the signals from the transmitting antennas 10 are able identify the transmitting antennas 10 and thus use its respective movement to determine information about the motion and pose of the hand.

FIGS. 3 and 4 illustrate embodiments of a controller using various sensor arrays. In the embodiments shown, the transmitting antennas 10 and the receiving antennas 11 are attached to a substrate 12, which may be adhered to the surface of the skin. Similar to the array of transmitting antennas and receiving antennas discussed above the arrangement of the substrates 12 may best be placed in order to detect the movement and poses of the hand. In FIG. 3 the substrate 12 is formed as one entire integrated piece that is attached to the skin of a user. The substrate 12 is adapted to flex and move in conjunction with the movement of the skin of the user. In FIG. 4, the substrate 12 forms multiple strips that are placed on the user's skin. The strips for the substrates 12 are attached to a user's skin. The substrate 12 is adapted to flex and move in conjunction with the movement of the skin of the user. The substrate 12 may be made of any type of material that is able to flex and move in conjunction with the movement of a user's skin. For example, the material may be a polymer or type of fabric that is attached to the surface of a user's skin.

The transmitting antennas 10 and receiving antennas 11 can be arranged and formed as part of an antenna array including one or more transmitting antenna and one or more receiving antenna. Generally, more antennas will lead to a better determination of deformation. The placement of antennas so that they move relative to each other as a result of the body movement that is desired to be measured, and not quantity alone, will lead to improved capability for measurement. In an embodiment, antennas are placed in key locations on or proximate to a body part in order to determine deformation. By "proximate" it is generally meant close enough that the antennas are able to provide information regarding the movement of the body part, for example on the wrist area to provide information regarding a hand posture or position. In an embodiment, antennas of an array are placed at specific locations on the wrist area where articulation occurs. In an embodiment, transmitting and receiving antennas (or transmitting and receiving antenna groups) are placed on the skin (with no first material), and the stretching of the skin and movement of subdermal structures causes the relative orientation of the antennas to shift, and the consequential signal changes can be used to understand the stretching and movement. In an embodiment, machine learning algorithms are used to associate movement with consequential signal changes, and then to model movement based on such consequential signal changes.

In an embodiment, very small transmit and receive antenna are positioned directly on a variety of nearby locations on the body, and can detect relative movement to one another—and that relative movement can be used to infer movement or positions of nearby body parts. In an embodiment, antenna are affixed to the hair, hair follicles or skin using small amounts of adhesive. In an embodiment, antenna are affixed to a thin structure that is a layer of flexible elastic material that is then secured to the body to act like a second skin, i.e., to move with the skin. In an embodiment, thin layer of flexible elastic material would not interfere with the natural motion of the skin in response to body movement.

An embodiment of the disclosure is an apparatus comprising a plurality of transmitting antennas adapted to be placed on a body part, wherein each of the plurality of transmitting antennas generates a unique frequency orthogonal signal; a plurality of receiving antennas adapted to placed on the body part, wherein the plurality of receiving antennas are adapted to receive the unique frequency orthogonal signals, wherein when the plurality of transmitting antennas and the plurality of receiving antennas are placed on the body part movement of skin of the body part causes the plurality of transmitting antennas and the plurality of receiving antennas to move with respect to each other; and wherein measurements of the unique frequency orthogonal signals received by at least one of the plurality of receiving antennas are used to provide measurements regarding movement of the skin of the body part.

Another embodiment of the disclosure is an apparatus comprising: a substrate; a transmitting antenna adapted to placed on the substrate, a plurality of receiving antennas adapted to placed on the substrate, wherein the receiving antennas are adapted to receive signals transmitted from the transmitting antenna, wherein when the substrate is placed on a body part movement of skin of the body part causes the transmitting antenna and the plurality of receiving antennas to move with respect to each other; and wherein measurements of signals received by at least one of the plurality of receiving antennas are used to provide measurements regarding movement of the skin of the body part.

While the invention has been particularly shown and described with reference to a preferred embodiment thereof, it will be understood by those skilled in the art that various changes in form and details may be made therein without departing from the spirit and scope of the invention.

The invention claimed is:
1. An apparatus comprising:
at least one transmitting antenna;
at least one receiving antenna;
at least one substrate coupled to the transmitting antenna and the receiving antenna, the substrate being adapted to:
  substantially conform to a skin surface of a body part of a wearer;
  flex in response to deformations of the skin surface; and
  enable an orientation of the transmitting antenna relative to the receiving antenna to change in response to the deformations of the skin surface; and
at least one physical processor adapted to:
  determine at least one value of at least one signal transmitted by the transmitting antenna and received by the receiving antenna during a first time period;
  determine at least one additional value of at least one additional signal transmitted by the transmitting antenna and received by the receiving antenna during a second time period; and
  use a difference between the value and the additional value to infer a deformation of the skin surface corresponding to a change to the orientation of the transmitting antenna relative to the receiving antenna.
2. The apparatus of claim 1, wherein the body part is a wrist area.

3. The apparatus of claim 2, wherein the deformation of the skin surface provides information regarding a movement and a position of a hand of the wearer.

4. The apparatus of claim 1, wherein the physical processor is further adapted to determine a movement of the wearer corresponding to the deformation.

5. The apparatus of claim 1, wherein the deformations of the skin surface comprise one or more of expansions, contractions, or shifts in the skin surface caused by muscle, ligament, or bone movement.

6. The apparatus of claim 1, wherein the substrate encircles the body part when placed thereon.

7. The apparatus of claim 1, wherein the transmitting antenna and the receiving antenna are randomly distributed when placed on the body part.

8. The apparatus of claim 1, wherein the body part is the wearer's neck.

9. The apparatus of claim 1, wherein the substrate forms a plurality of strips on which the receiving antenna and the transmitting antenna are placed.

10. The apparatus of claim 1, wherein the substrate is formed from a flexible material.

11. An apparatus comprising:
multiple antennas;
a flexible substrate coupled to the multiple antennas, the flexible substrate being adapted to:
    substantially conform to a skin surface of a wrist of a wearer;
    deform in response to deformations of the skin surface; and
    enable an orientation of a first one or more of the multiple antennas relative to a second one or more of the multiple antennas to change in response to the deformations of the skin surface; and
at least one physical processor adapted to:
    determine at least one value of at least one signal transmitted or received by the multiple antennas during a first time period;
    determine at least one additional value of at least one additional signal transmitted or received by the multiple antennas during a second time period; and
    use a difference between the value and the additional value to infer at least one of a movement, a position, or a pose of the wearer's hand corresponding to a deformation of the skin surface of the wearer's wrist and a resulting change to the orientation of the first one or more of the multiple antennas relative to the second one or more of the multiple antennas.

12. The apparatus of claim 11, wherein the at least one physical processor is adapted to use the difference between the value and the additional value to infer the movement of the wearer's hand.

13. The apparatus of claim 11, wherein the at least one physical processor is adapted to use the difference between the value and the additional value to infer the position the wearer's hand.

14. The apparatus of claim 11, wherein the multiple antennas are formed as an array on the flexible substrate.

15. The apparatus of claim 11, wherein the multiple antennas form rows on the flexible substrate.

16. The apparatus of claim 11, wherein the multiple antennas are positioned to encircle the wearer's wrist when worn.

17. The apparatus of claim 11, wherein the multiple antennas are randomly distributed on the flexible substrate.

18. The apparatus of claim 11, wherein the flexible substrate is formed as a plurality of strips.

19. The apparatus of claim 11, wherein the flexible substrate is formed from a flexible material.

20. The apparatus of claim 11, wherein the at least one physical processor is adapted to use the difference between the value and the additional value to infer the pose of the wearer's hand.

* * * * *